US012783339B2

(12) United States Patent
Radhakrishnan et al.

(10) Patent No.: US 12,783,339 B2
(45) Date of Patent: Nov. 3, 2026

(54) SYSTEM AND METHOD FOR PROCESSING DATA INTERACTIONS USING OPTICAL COMPUTING

(71) Applicant: Bank of America Corporation, Charlotte, NC (US)

(72) Inventors: Sathish Kumar Radhakrishnan, Vellore (IN); Durga Prasad P Kutthumolu, Hyderabad (IN); Subburathinam Krishnan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 606 days.

(21) Appl. No.: 18/363,160

(22) Filed: Aug. 1, 2023

(65) Prior Publication Data

US 2025/0045862 A1 Feb. 6, 2025

(51) Int. Cl.

*G06F 11/00* (2006.01)
*G06F 9/48* (2006.01)
*G06F 11/07* (2006.01)
*G06T 1/20* (2006.01)
*G06T 1/60* (2006.01)

(52) U.S. Cl.

CPC .......... *G06F 11/079* (2013.01); *G06F 9/4843* (2013.01); *G06F 11/0709* (2013.01); *G06T 1/20* (2013.01); *G06T 1/60* (2013.01)

(58) Field of Classification Search

CPC ............... G06F 11/079; G06F 11/0709; G06F 11/0793; G06F 11/2028; G06F 11/203; G06F 11/2033; G06F 9/4843; G06T 1/20; G06T 1/60

See application file for complete search history.

(56) References Cited

U.S. PATENT DOCUMENTS

| | | | | |
|---|---|---|---|---|
| 8,218,965 | B1 * | 7/2012 | Uhlhorn ............. | H04Q 11/0062 398/4 |
| 10,069,573 | B2 | 9/2018 | Krovi et al. | |
| 10,268,232 | B2 | 4/2019 | Harris et al. | |
| 10,608,663 | B2 | 3/2020 | Gould et al. | |
| 10,619,993 | B2 | 4/2020 | Mower et al. | |

(Continued)

FOREIGN PATENT DOCUMENTS

WO 2018205729 A1 11/2018

OTHER PUBLICATIONS

Optical Computer (Photonic Computer); https://www.techtarget.com/whatis/definition/optical-computer-photonic-computer#:~:text=An%20optical%20computer%20(also%20called,current%2C%20to%20perform%20digital%20computations; printed Jul. 27, 2023.

(Continued)

*Primary Examiner* — Joseph D Manoskey

(57) ABSTRACT

A processor receives a command to process a job, generates a plurality of process images, and deploys the process images on a plurality of optical computing nodes. The processor detects that a first process image has failed at a first optical computing node, and in response, identifies a first reference process image corresponding to the first process image. The processor determines a root cause associated with the failed first process image based on comparing the first process image to the first reference process image. The processor resolves the root cause and re-deploys the first process image at the first computing node or a second computing node.

20 Claims, 2 Drawing Sheets

(56) References Cited

U.S. PATENT DOCUMENTS

| | | | |
|---|---|---|---|
| 10,839,096 B2 | 11/2020 | Kraemer et al. | |
| 11,017,309 B2 | 5/2021 | Roques-Carmes et al. | |
| 11,206,466 B2 | 12/2021 | Menard et al. | |
| 11,626,931 B2 | 4/2023 | Bunandar et al. | |
| 11,671,182 B2 | 6/2023 | Bunandar et al. | |
| 11,687,767 B2 | 6/2023 | Shen et al. | |
| 12,443,356 B2 * | 10/2025 | Turner | G06F 3/0673 |
| 2019/0356394 A1 * | 11/2019 | Bunandar | G02F 1/21 |
| 2021/0173238 A1 | 6/2021 | Hosseinzadeh et al. | |
| 2025/0251970 A1 * | 8/2025 | Singh | G06N 10/20 |

OTHER PUBLICATIONS

Optical Logic (DL); https://link.springer.com/article/10.1007/s12200-022-00001-y; printed Jul. 27, 2023.

Quantum Semantic Search; https://scholar.google.com/scholar?hl=en&as_sdt=0%2C5&q=Quantum+semantic+search+Algorithms+for+optical+computing+&btnG=; printed Jul. 27, 2023.

Semantic Techniques in Quantum Computation; https://library.villanova.edu/Find/Record/2384464/TOC; printed Jul. 27, 2023.

Zero-Knowledge Proofs—A Powerful Addition to Blockchain; https://blockheadtechnologies.com/zero-knowledge-proofs-a-powerful-addition-to-blockchain/; printed Aug. 1, 2023.

Wintermute Rekt 2; https://rekt.news/wintermute-rekt-2/; printed Jul. 27, 2023.

Amazon's Server Outage Took Down a 'Decentralized' Crypto Exchange; https://www.vice.com/en/article/wxdnxy/amazons-server-outage-took-down-a-decentralized-crypto-exchange; printed Jul. 27, 2023.

Solana DeFi Ecosystem Overview; https://thedefiant.io/solana-defi-ecosystem-overview; printed Jul. 27, 2023.

Binery Encoder and Decoder; https://electronicspost.com/binary-encoder-and-decoder/; printed Jul. 27, 2023.

An Approach for Implementing the zkKYC Solution Concept in Decentralized Finance; https://eprint.iacr.org/2022/321.pdf; printed Jul. 27, 2023.

* cited by examiner

SYSTEM AND METHOD FOR PROCESSING DATA INTERACTIONS USING OPTICAL COMPUTING

TECHNICAL FELD

The present disclosure relates generally to data processing, and more specifically to a system and method for processing data interactions using optical computing.

BACKGROUND

A job being processed at an computing node (e.g., optical computing node) may fail because of several reasons or errors including, but not limited, hardware errors such as insufficient memory resources (e.g., photonic memory resources), insufficient processing resources (e.g., photonic processing resources), and power failure, or software errors such as unavailability of required data files, missing file attributes, unavailability of database tables, inaccessible or erroneous data, and erroneous or ambiguous logic. Such processing errors and failures may result in unintended and undesirable processing delays.

SUMMARY

The system and method implemented by the system as disclosed in the present disclosure provide technical solutions to the technical problems discussed above by detecting and resolving errors associated with failed jobs.

For example, the disclosed system and methods provide the practical application of resolving errors associated with a failed job or a portion thereof intelligently and securely. As described in embodiments of the present disclosure, in response to receiving a command to process a job, a processing manager generates a plurality of process images associated with processing the job and deploys the process images for processing at a plurality of optical computing nodes. Each process image represents a portion of the processing of the job. Based on monitoring the plurality of optical computing nodes, the processing manager may detect that a first process image failed to process at a first optical computing node of the plurality of optical computing nodes. In response, the processing manager searches an image repository of reference process images and determines a first reference process image that corresponds to the failed first process image. Each reference process image from the image repository corresponds to a processing task or set of tasks commonly processed in a computing infrastructure. Additionally, each reference process image may correspond to a task or set of tasks that was successfully processed at an earlier point in time by a computing node. The processing manager compares the failed first process image to the first reference process image, wherein the comparison includes comparing metadata associated with the failed first process image and the first reference process image. Based on this comparison, processing manager determines a root cause that caused the first process image to fail at the first optical computing node, wherein the root cause includes an inconsistency in the metadata between the failed first process image and the first reference process image. The processing manager resolves the root cause associated with the first process image by removing the inconsistency between the first process image and the first reference process image and re-deploys the first process image for processing at the first optical computing node or a second optical computing node.

By investigating and resolving a root cause associated with a failed process image intelligently and quickly, the disclosed system and method help avoid a job from failing. By avoiding job failures in a computing system, the disclosed system and method improve the performance of computing nodes running those jobs, and generally improve performance of computing networks.

The disclosed system and method provide an additional practical application of securely re-deploying a process image after a root cause has been resolved. For example, processing manager may be configured to authenticate a failed process image using a Zero Knowledge Proof (ZKP) logic before re-deploying at a computing node. Data included and/or associated with process images may be vulnerable to cyber-attacks when they fail to process correctly and during re-deployment. Verifying a failed process image or an updated process image using the ZKP logic before re-deploying at a computing node enhances data privacy and data security in distributed networks.

Thus, the disclosed system and method generally improve the technology associated with a computing infrastructure.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
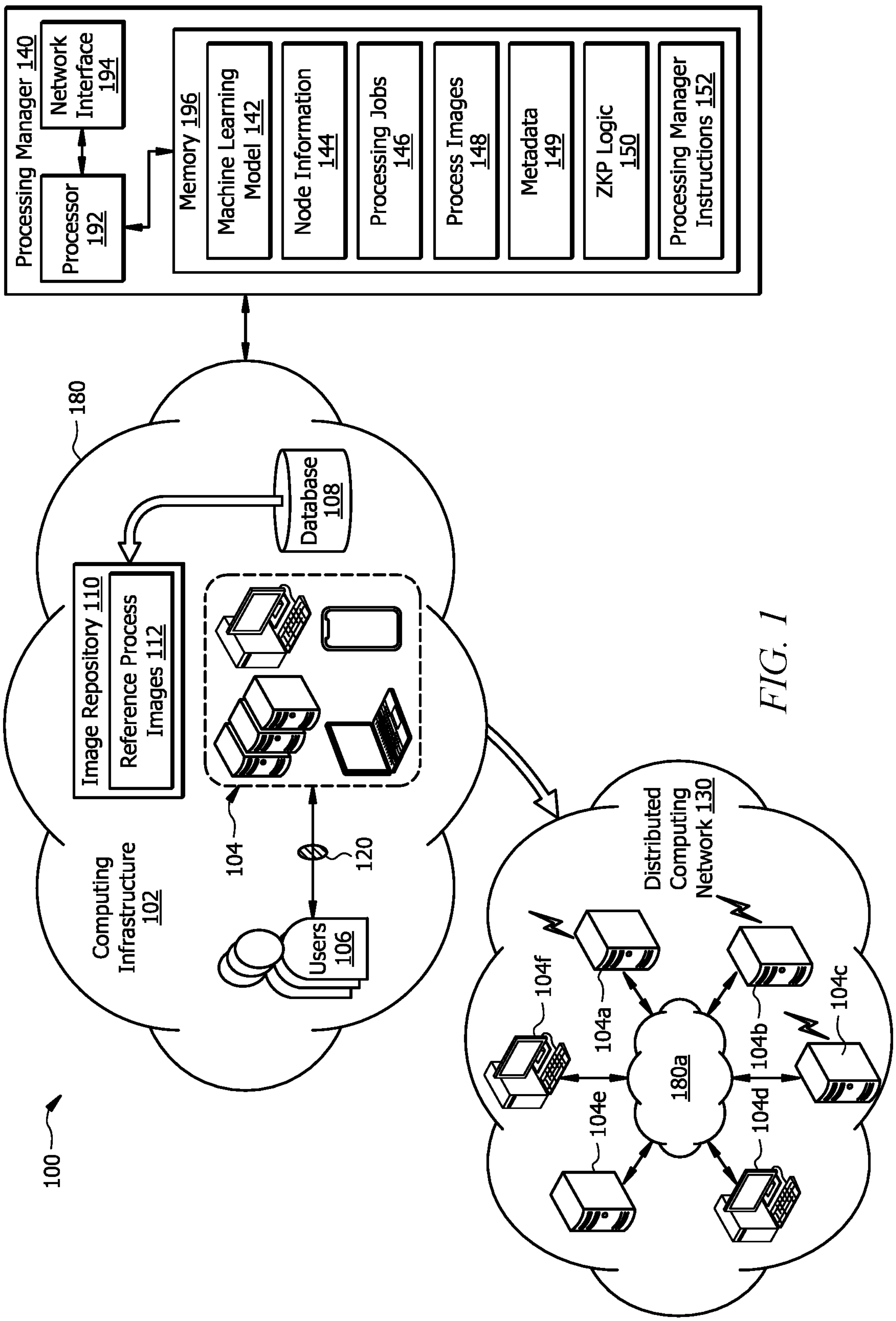
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 connected to a network 180. Computing infrastructure 102 may include a plurality of hardware and software components. The hardware components may include, but are not limited to, computing nodes 104 such as desktop computers, smartphones, tablet computers, laptop computers, servers and data centers, mainframe computers, virtual reality (VR) headsets, augmented reality (AR) glasses and other hardware devices such as printers, routers, hubs, switches, and memory devices (e.g., databases 108) all connected to the network 180. Software components may include software applications that are run by one or more of the computing nodes 104 including, but not limited to, operating systems, user interface applications, third party software, database management software, service management software, mainframe software, metaverse software and other customized software programs implementing particular functionalities. For example, software code relating to one or more software applications may be stored in a memory device and one or more processors (e.g., belonging to one or more computing nodes 104) may execute the software code to implement respective functionalities. In one embodiment, at least a portion of the computing infrastructure 102 may be representative of an Information Technology (IT) infrastructure of an organization.

One or more of the computing nodes 104 may be operated by a user 106. For example, a computing node 104 may provide a user interface using which a user 106 may operate the computing node 104 to perform data interactions within the computing infrastructure 102.

One or more computing nodes 104 of the computing infrastructure 102 may be representative of a computing system which hosts software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., processing manager 140) as described below. In certain embodiments, one or more of the computing nodes 104 may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet.

At least a portion of the computing infrastructure 102 may include a distributed computing network 130. For example, a portion of the computing nodes 104 may form the distributed computing network 130. As shown in FIG. 1 an example distributed computing network 130 includes computing nodes 104*a*, 104*b*, 104*c*, 104*d*, 104*e* and 104*f* connected to each other via network 180 (shown as 180*a*). The distributed computing network 130 implements distributed computing which generally refers to a method of making multiple computers (e.g., computing nodes 104*a*-104*f*) work together to solve a common problem. This makes a computer network (e.g., distributed network 130) appear as a powerful single computer that provides large-scale resources to deal with complex challenges. For example, distributed computing can encrypt large volumes of data, solve complex physics and chemical equations with many variables, and render high-quality, three-dimensional video animation. Distributed computing often uses specialized software applications that are configured to run on several computing nodes 104 instead of on just one computer, such that different computers perform different tasks and communicate to develop the final solution. High-performing distributed computing is often used in engineering research, financial services, energy sector and the like to run complex processes. One example of a distributed computing network 130 is a blockchain network.

One or more computing nodes 104 in the distributed computing network 130 may be optical computing nodes or optical computers. For example, in the example distributed computing network 130 shown in FIG. 1, computing nodes 104*a*, 104*b*, and 104*c* are optical computing nodes. Optical computing or photonic computing uses light waves produced, for example, by lasers or incoherent light sources for data processing, data storage, and/or data communication. An optical computer, also known as a photonic computer, is a device that performs digital computations using photons in visible light or infrared (IR) beams as opposed to electric current. Unlike traditional computers, which use electrical signals to perform calculations, optical computing uses light. This allows for a much higher frequency of data processing, making it possible to run large and complex calculations at incredibly fast speeds. One of the key technologies behind optical computing is photonic computing, which uses photons to perform calculations instead of electrons. This allows for a more efficient and synthetic approach to computation, as photons can be easily manipulated and controlled to perform a wide range of tasks. Optical computing is able to operate at much higher speeds than traditional electronic computing and is also faster than quantum computing in some cases. This is due to the fact that photons, the particles of light used in optical computing, can be easily manipulated and controlled to perform a wide range of tasks. Optical computing nodes (e.g., 104*a*, 104*b*, 104*c*) often use optical/photonic processors and/or optical/photonic memory devices instead of a using conventional processors and/or memory devices.

At least a portion of the computing infrastructure 102 may implement processing manager 140 which may perform a plurality of operations associated with processing of data processing jobs 146 within the computing infrastructure 102. A data processing job 146 in computing refers to a unit of work or a unit of execution which includes a series of processing tasks. For example, a processing job 146 may be associated with an interaction within the computing infrastructure 102, such as transfer of data between two users 106. It may be noted that the terms "data processing job", "processing job" and "job" are used interchangeably throughout this disclosure. In a distributed computing environment such as distributed computing network 130, a jobs scheduler may be configured to break up a particular processing job 146 into a plurality of tasks or sets of tasks and schedule the tasks to run on a plurality of computing nodes 104. Each task or set of tasks represents a portion of the processing associated with the processing job 146. All assigned computing nodes 104 work together to complete the processing of the single processing job 146. For example, processing manager 140 may be configured to divide a particular processing job 146 into a plurality of component tasks or sets of tasks and assign the component tasks to run on a plurality of computing nodes 104 (e.g., two or more of computing nodes 104*a*-104*f*) of the distributed computing network 130. Each task or set of tasks running at a particular computing node 104 may be represented by a process image 148, wherein a process image 148 represents processing (or state of processing) of the task or set of tasks at the particular computing node 104. A process image 148 generally includes all metadata 149 needed to process a corresponding task or set of tasks such as code segments, data segments, and other metadata needed to process the task or set of tasks. Thus, essentially, processing manager 140 divides a particular processing job 146 into several process images 148, wherein each process image 148 represents a process (or state of the process) associated with processing a respective task or set of tasks involved in processing a processing job 146. The processing manager 140 may be configured to distribute the process images 148 associated with a processing job 146 over a plurality of computing nodes 104 (e.g., two or more optical computing nodes 104*a*, 104*b*, 104*c*) of the distributed computing network 130.

The processing manager 140 comprises a processor 192, a memory 196, and a network interface 194. The processing manager 140 may be configured as shown in FIG. 1 or in any other suitable configuration.

The processor 192 comprises one or more processors operably coupled to the memory 196. The processor 192 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 192 may be a programmable logic device, a microcontroller, a microprocessor, or any suitable combination of the preceding. The processor 192 is communicatively coupled to and in signal communication with the memory 196. The one or more processors are configured to process data and may be implemented in hardware or software. For example, the processor 192 may be 8-bit, 16-bit, 32-bit, 64-bit or of any other suitable architecture. The processor 192 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., upgrade manager instructions 152) to implement the processing manager 140. In this way, processor 192 may be a special-purpose computer designed to implement the functions disclosed herein. In one or more embodiments, the processing manager 140 is implemented using logic units, FPGAs, ASICs, DSPs, or any other suitable hardware. The processing manager 140 is configured to operate as described with reference to FIG. 2. For example, the processor 192 may be configured to perform at least a portion of the method 200 as described in FIG. 2.

The memory 196 comprises a non-transitory computer-readable medium such as one or more disks, tape drives, or solid-state drives, and may be used as an over-flow data storage device, to store programs when such programs are selected for execution, and to store instructions and data that are read during program execution. The memory 196 may be volatile or non-volatile and may comprise a read-only memory (ROM), random-access memory (RAM), ternary content-addressable memory (TCAM), dynamic random-access memory (DRAM), and static random-access memory (SRAM).

The memory 196 is operable to store machine learning model 142, node information 144, processing jobs 146, process images 148, zero-knowledge proof (ZKP) logic 150 and the processing manager instructions 152. The processing manager instructions 152 may include any suitable set of instructions, logic, rules, or code operable to execute the processing manager 140.

The network interface 194 is configured to enable wired and/or wireless communications. The network interface 194 is configured to communicate data between the processing manager 140 and other devices, systems, or domains (e.g. computing nodes 104). For example, the network interface 194 may comprise a Wi-Fi interface, a LAN interface, a WAN interface, a modem, a switch, or a router. The processor 192 is configured to send and receive data using the network interface 194. The network interface 194 may be configured to use any suitable type of communication protocol as would be appreciated by one of ordinary skill in the art.

It may be noted that each of the computing nodes 104 may be implemented like the processing manager 140 shown in FIG. 1. For example, each of the computing nodes 104 may have a respective processor and a memory that stores data and instructions to perform operations discussed above.

A process image 148 being processed at a particular computing node 104 may fail because of several reasons or errors including, but not limited, hardware errors such as insufficient memory resources, insufficient processing resources, and power failure, or software errors such as unavailability of required data files, missing file attributes, unavailability of database tables, inaccessible or erroneous data, and erroneous or ambiguous logic. Such, processing errors and failures may result in unintended and undesirable processing delays.

Embodiments of the present disclosure describe techniques to resolve errors associated with processing a processing job 146 in a distributed computing environment. For example, as described in embodiments of the present disclosure, processing manager 140 may be configured to detect an error/root cause associated with processing a process image 148 at a particular computing node 104 (e.g., optical computing node 104*a-c*) in the distributed computing network 130 and resolve the detected error.

Processing manager 140 may be configured to receive a command 120 to process a particular processing job 146. The command 120 may be manually initiated by a user 106 (e.g., using a computing node 104) or automatically generated by a computing node 104 (e.g., a web server, database server, mainframe server etc.). In response to receiving the command 120, processing manager 140 may be configured to generate a plurality of process images 148, wherein each process image 148 corresponds to one or more processing tasks that need to be processed to complete processing the processing job 146. In other words, each process image 148 represents a portion of the processing of the processing job 146. As described above, a process image 148 includes all data/metadata 149 needed to process a corresponding task or set of tasks associated with the processing job 146 such as code segments, data segments, and other metadata needed to process the task or set of tasks. Processing manager 140 may be configured to deploy the process images 148 associated with the processing job 146 for processing at a plurality of computing nodes 104 (e.g., optical computing nodes 104*a*, 104*b*, 104*c*) in the distributed computing network 130. For example, processing manager 140 divides the processing job 146 into three separate processing tasks and generates one process image 148 per processing task. Processing manger 140 assigns each of the three process images 148 to a different optical computing node 104. For example, processing manager 140 deploys a first process image 148 at optical computing node 104*a*, deploys a second process image 148 at optical computing node 104*b*, and deploys a third process image 148 at optical computing node 104*c*.

Each optical computing node (e.g., 104*a*, 104*b*, 104*c*) may be configured to process the respective process image 148 in the optical domain. For example, each optical computing node (e.g., 104*a*, 104*b*, 104*c*) may be configured to convert data bits associated with the respective process image 148 into light waves and use optical processors and photonic memories to process the process image 148 in the optical domain. However, as mentioned above, processing of a process image 148 may fail at a respective optical computing node (e.g., 104*a-c*) due to hardware and/or software errors. As each process image 148 represents a portion of the processing associated with the processing job 146, failure in processing a particular process image 148 may cause failure of the entire processing job 146.

Once the process images 148 are deployed for processing at the respective computing nodes 104 (e.g., optical computing nodes 104*a-c*), processing manager 140 may be configured to monitor each processing node 104 to detect any interruptions, errors and/or failures associated with processing the process images 148 at the respective computing nodes 104. For example, based on monitoring a first optical computing node 104*a*, processing manager 140 may detect that a first process image 148 failed to process at the first optical computing node 104*a*. Processing manager 140 may be configured to detect that a process image 148 failed processing at a particular computing node 104 in response to detecting an error (e.g., error code) generated by the particular computing node 104 while processing the process image 148.

In response to detecting a failure associated with processing a process image 148 at a particular computing node 104, processing manager 140 may be configured to determine a root cause that caused the failure in processing the process image 148 at the particular computing node 104. In this context, processing manager 140 may have access to a central image repository 110 stored at a database 108 in the computing infrastructure 102. In an alternative or additional embodiment, the image repository 110 may be stored in memory 196 associated with the processing manager 140. Image repository 110 may be configured to store a plurality of reference process images 112, wherein each reference process image 112 may correspond to a processing task or set of tasks commonly processed in the computing infrastructure 102. Additionally, each reference process image 112 may correspond to a task or set of tasks that was successfully processed at an earlier point in time by a computing node 104.

In order to determine a root cause of a failure associated with a process image 148, processing manager 140 extracts from the image repository, a reference process image 112 that corresponds to the failed process image 148. For example, the reference process image 112 that corresponds to the failed process image 148 may be associated with the same task or set of tasks associated with failed process image 148. Processing manager 140 may be configured to compare the failed process image 148 with the reference process image 112. This comparison may include comparison of metadata 149 associated with the failed process image 148 and corresponding metadata associated with the reference process image 112. For example, the comparison may include a comparison of the code segments, data segments, and other metadata included in the failed process image 148 to the respective code segments, data segments, and other metadata included in the reference process image 112. Processing manager 140 may be configured to determine a root cause of failure associated with the failed process image 148 based on the comparison. For example, based on the comparison, processing manager 140 determines inconsistencies between corresponding metadata of the failed process image 148 and the corresponding reference process image 112. For example, based on the comparison, processing manager 140 may determine that a memory allocation (e.g., allocation of photonic memory) does not match between the failed process image 148 and the reference process image 112, wherein the failed process image 148 has a smaller amount of photonic memory allocated for processing the associated tasks as compared to the reference process image 112. In response, processing manager 140 may determine that insufficient memory allocation is the root cause associated with the failed process image 148. Similarly, processing manager 140 may detect other inconsistencies or mismatches between the failed process image 148 and the reference process image 112 including, but not limited to, mismatch in software code, mismatch in input data files, and mismatch in file attributes. Processing manager 140 may be configured to determine one or more of these detected mismatches as root causes for failure of the failed process image 148.

Once, a root cause associated with the failed process image 148 has been determined, processing manager 140 may be configured to resolve the root cause and re-deploy a corrected process image 148 at a computing node 104. In one embodiment, processing manager 140 may be configured to resolve the detected root cause by revising the failed process image 148 to correct the detected inconsistency between the failed process image 148 and the corresponding reference process image 112. For example, when the detected inconsistency includes a mismatch in memory allocation between the failed process image 148 and the reference process image 112, processing manager 140 revises the failed process image 148 to update the memory allocation to match the memory allocation in the reference process image 112. In another example, when the detected inconsistency includes a mismatch in a code segment, between the failed process image 148 and the reference process image 112, processing manager 140 revises the failed process image 148 to bring the code segment in line with the corresponding code segment of the reference process image 112. In an alternative or additional embodiment, processing manager 140 may be configured to generate an updated process image 148 after correcting the root cause associated with the failed process image 148.

Once the detected root cause associated with the failed process image 148 is resolved (e.g., the updated process image 148 has been generated), processing manager 140 may be configured to re-deploy the failed process image 148. In one embodiment, re-deploying the failed process image 148 includes deploying the updated process image 148. Processing manager 140 may deploy the updated process image 148 at a computing node 104 that originally processed the failed process image 148 or at another computing node 104. Processing manager 140 may be configured to determine whether the updated process image 148 is to be re-deployed at the computing node 104 that originally processed the failed process image 148 based on whether a detected root cause includes a software error or a hardware error detected at the original computing node 104. For example, in response to detecting that a root cause associated with the failed process image 148 corresponds to a software error (e.g., based on comparing the failed process image 148 and the reference process image 112) and not a hardware error (hardware malfunction) associated with the original computing node 104, processing manager 140 may be configured to re-deploy the updated process image 148 at the original computing node 104. In one embodiment, processing manager 140 may be configured to deploy the updated process image 148 at a different computing node 104 (e.g., different from the original computing node 104) even when no hardware error was detected in the original computing node 104, based on a method described below.

In some embodiments, processing manager may be configured to detect hardware errors associated with a computing node 104 that caused a process image 148 to fail at the computing node 104. A hardware error may include insufficient allocation of resources (e.g., processing and/or memory resources) for processing the failed process image 148 or a hardware malfunction associated with the computing node 104 such as processor failure, memory failure, loss of power and the like. Processing manager 140 may be configured to detect insufficient allocation of resources at an original computing node 104 by comparing the failed process image 148 and a corresponding reference process image 112 and detecting a mismatch in resource allocation between the failed process image 148 and a corresponding reference process image 112. To detect hardware malfunctions associated with computing nodes 104, processing manager 140 may be configured to monitor a plurality of performance related parameters associated with each computing node 104. Processing manager 140 may determine that a particular computing node 104 has a particular hardware malfunction when an associated performance parameter does not satisfy pre-set performance standards. In response to detecting that the failed process image 148 failed because of a hardware error including insufficient resource allocation (e.g., memory allocation) at the original computing node 104, processing manager 140 may be configured to deploy an updated process image (e.g., with corrected resource allocation) at the original computing node 104.

On the other hand, in response to detecting that the failed process image 148 failed because of a hardware malfunction associated with the original computing node 104, processing manager 140 may be configured to deploy the same failed process image 148 at a different computing node 104. Processing manager 140 may be configured to determine an appropriate computing node 104, that is different from the original computing node 104, to re-deploy the failed process image 148, for example, in response to detecting the failed process image 148 failed because of a hardware malfunction associated with the original computing node 104. To determine an appropriate computing node 104 to re-deploy the failed process image 148, processing manager 140 may be configured to search for and determine a computing node 104 that has sufficient resources (e.g., processing and/or memory resources) available to process the failed process image 148. In this context, processing manager 140 analyzes one or more attributes associated with the failed process image 148, wherein the one or more attributes are indicative of an amount of resources needed to process the first process image. Processing manager 140 determines the amount of resources needed to process the failed process image 148 based on analyzing the attributes associated with the failed process image 148. Processing manager 140 searches for a computing node 104 that has available at least the determined amount of resources needed to process the failed process image 148. Processing manager 140 accesses node information 144 which includes recent information regarding resources currently available at computing nodes 104. In one embodiment, node information 144 is continually updated (e.g., periodically and/or according to a pre-set schedule) to reflect the recent information regarding resources available at the computing nodes 104. Based on reviewing the node information 144, processing manager 140 identifies a computing node 104 that at least has the determined amount of resources available to process the failed process image 148 and deploys the failed process image 148 at the identified computing node 104.

In one or more embodiments, processing manager 140 may be configured to authenticate the failed process image or the updated process image (whichever the case may be) using a Zero Knowledge Proof (ZKP) logic 150 before re-deploying at a computing node 104. ZKP is often used in decentralized distributed networks (e.g., distributed computing network 130) to verify information without compromising sensitive data. Data included and/or associated with process images 148 may be vulnerable to cyber attacks when they fail to process correctly and during re-deployment. Verifying a failed process image 148 or updated process image 148 using the ZKP logic 150 before re-deploying at a computing node 104 enhances data privacy and data security in distributed networks 130.

In some embodiments, processing manager 140 may be configured to use a machine learning model 142 to perform one or more of determining errors/root causes associated with failed process images 148 and resolving errors associated with failed process images 148. For example, the machine learning model 142 may be trained using reference process images 112 from the image repository 110 to determine errors/root causes associated with failed process images 148.

Figure 2:
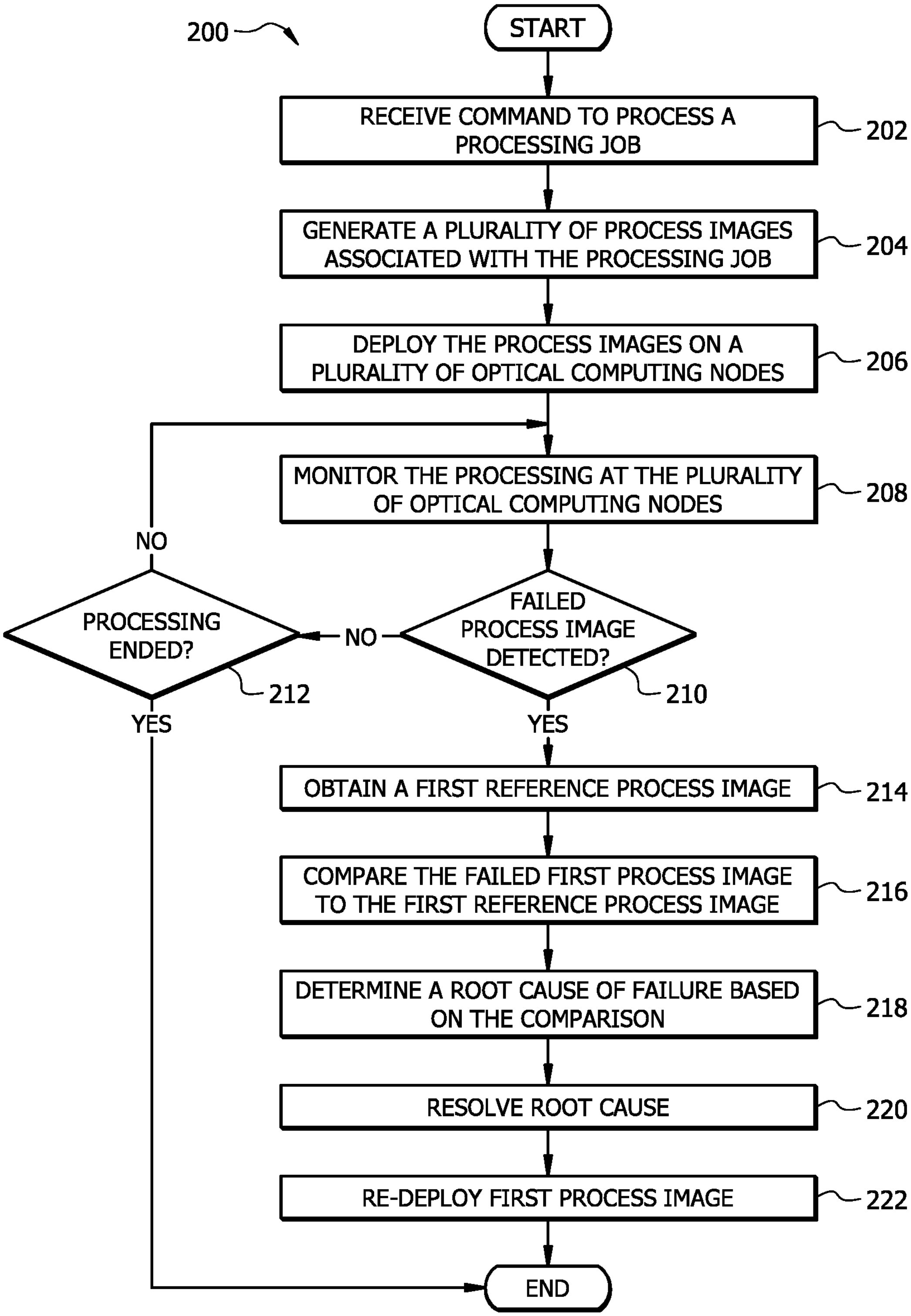
FIG. 2 illustrates a flowchart of an example method for resolving errors associated with failed process images, in accordance with one or more embodiments of the present disclosure.

FIG. 2 illustrates a flowchart of an example method 200 for resolving errors associated with failed process images 148, in accordance with one or more embodiments of the present disclosure. Method 200 may be performed by the processing manager 140 shown in FIG. 1.

At operation 202, processing manager 140 receives a command to process a processing job 146. As described above, processing manager 140 may be configured to receive a command 120 to process a particular processing job 146. The command 120 may be manually initiated by a user 106 (e.g., using a computing node 104) or automatically generated by a computing node 104 (e.g., a web server, database server, mainframe server etc.).

At operation 204, processing manager 140 generates a plurality of process images 148 associated with processing the processing job 146, wherein each process image 148 represents a portion of the processing of the processing job 146.

As described above, in response to receiving the command 120, processing manager 140 may be configured to generate a plurality of process images 148, wherein each process image 148 corresponds to one or more processing tasks that need to be processed to complete processing the processing job 146. In other words, each process image 148 represents a portion of the processing of the processing job 146. As described above, a process image 148 includes all data/metadata 149 needed to process a corresponding task or set of tasks associated with the processing job 146 such as code segments, data segments, and other metadata needed to process the task or set of tasks.

At operation 206, processing manager 140 deploys the plurality of process images 148 for processing on a plurality of optical computing nodes 104 (e.g., 104*a*, 104*b*, 104*c*), wherein each of the plurality of optical computing nodes 104 is assigned a portion (e.g., one or more) of the process images 148.

As described above, processing manager 140 may be configured to deploy the process images 148 associated with a processing job 146 for processing at a plurality of computing nodes 104 (e.g., optical computing nodes 104*a*, 104*b*, 104*c*) in the distributed computing network 130. For example, processing manager 140 divides the processing job 146 into three separate processing tasks and generates one process image 148 per processing task. Processing manger 140 assigns each of the three process images 148 to a different optical computing node 104. For example, processing manager 140 deploys a first process image 148 at optical computing node 104*a*, deploys a second process image 148 at optical computing node 104*b*, and deploys a third process image 148 at optical computing node 104*c*.

At operation 208, processing manager 140 monitors processing of the process images 148 at the respective computing nodes 104.

At operation 210, processing manager 140 checks whether any of the process images 148 failed to process at a respective optical computing node 104. If the processing manager 140 does not detect that one or more of the process images 148 has failed processing, method 200 proceeds to operation 212, where the processing manager 140 checks whether all the plurality of process images 148 have successfully processed at respective computing nodes 104. Upon detecting that all the process images 148 have finished their processing, method 200 ends here. However, upon detecting that all the process images 148 have not finished their processing, method 200 moves back to operation 208, where the processing manager 140 continues to monitor the processing of the process images 148 at the respective optical computing nodes 104.

In one embodiment, based on monitoring the processing of the process images 148 (e.g., at operation 208) at the respective optical computing nodes 104, processing manager 140 may detect (e.g., at operation 210) that a first process image 148 failed to process at a first optical computing node 104*a* of the plurality of optical computing nodes (e.g., 104*a*, 104*b*, 104*c*).

As described above, once the process images 148 are deployed for processing at the respective computing nodes 104 (e.g., optical computing nodes 104*a-c*), processing manager 140 may be configured to monitor each processing node 104 to detect any interruptions, errors and/or failures associated with processing the process images 148 at the respective computing nodes 104. For example, based on monitoring a first optical computing node 104*a*, processing manager 140 may detect that a first process image 148 failed to process at the first optical computing node 104*a*. Processing manager 140 may be configured to detect that a process image 148 failed processing at a particular computing node 104 in response to detecting an error (e.g., error code) generated by the particular computing node 104 while processing the process image 148.

At operation 214, in response to detecting that the first process image 148 has failed to process at the first optical computing node 104*a*, processing manager 140 obtains (e.g., accesses from memory 196 or database 108) a first reference process image 112 corresponding to the failed first process image 148.

As described above, in response to detecting a failure associated with processing a process image 148 at a particular computing node 104, processing manager 140 may be configured to determine a root cause that caused the failure in processing the process image 148 at the particular computing node 104. In this context, processing manager 140 may have access to a central image repository 110 stored at a database 108 in the computing infrastructure 102. In an alternative or additional embodiment, the image repository 110 may be stored in memory 196 associated with the processing manager 140. Image repository 110 may be configured to store a plurality of reference process images 112, wherein each reference process image 112 may correspond to a processing task or set of tasks commonly processed in the computing infrastructure 102. Additionally, each reference process image 112 may correspond to a task or set of tasks that was successfully processed at an earlier point in time by a computing node 104.

In order to determine a root cause of a failure associated with a process image 148, processing manager 140 extracts from the image repository, a reference process image 112 that corresponds to the failed process image 148. For example, the reference process image 112 that corresponds to the failed process image 148 may be associated with the same task or set of tasks associated with failed process image 148.

At operation 216, processing manager 140 compares the failed first process image 148 to the first reference process image 112, wherein the comparison includes comparing metadata associated with the failed first process image 148 and the first reference process image 112.

At operation 218, processing manager 140 determines, based on the comparison between the failed first process image 148 and the first reference process image 112, a root cause that caused the first process image 148 to fail at the first optical computing node 104*a*, wherein the root cause includes an inconsistency in the metadata between the failed first process image 148 and the first reference process image 112.

As described above, processing manager 140 may be configured to compare the failed process image 148 with the reference process image 112. This comparison may include a comparison of the code segments, data segments, and other metadata included in the failed process image 148 to the respective code segments, data segments, and other metadata included in the reference process image 112. Processing manager 140 may be configured to determine a root cause of failure associated with the failed process image 148 based on the comparison. For example, based on the comparison, processing manager 140 determines inconsistencies between corresponding metadata of the failed process image 148 and the corresponding reference process image 112. For example, based on the comparison, processing manager 140 may determine that a memory allocation (e.g., allocation of photonic memory) does not match between the failed process image 148 and the reference process image 112, wherein the failed process image 148 has a smaller amount of photonic memory allocated for processing the associated tasks as compared to the reference process image 112. In response, processing manager 140 may determine that insufficient memory allocation is the root cause associated with the failed process image 148. Similarly, processing manager 140 may detect other inconsistencies or mismatches between the failed process image 148 and the reference process image 112 including, but not limited to, mismatch in software code, mismatch in input data files, and mismatch in file attributes. Processing manager 140 may be configured to determine one or more of these detected mismatches as root causes for failure of the failed process image 148.

At operation 220, processing manager 140 resolves the root cause associated with the first process image 148 by removing the inconsistency between the first process image 148 and the first reference process image 112.

As described above, once, a root cause associated with the failed process image 148 has been determined, processing manager 140 may be configured to resolve the root cause and re-deploy a corrected process image 148 at a computing node 104. In one embodiment, processing manager 140 may be configured to resolve the detected root cause by revising the failed process image 148 to correct the detected inconsistency between the failed process image 148 and the corresponding reference process image 112. For example, when the detected inconsistency includes a mismatch in memory allocation between the failed process image 148 and the reference process image 112, processing manager 140 revises the failed process image 148 to update the memory allocation to match the memory allocation in the reference process image 112. In another example, when the detected inconsistency includes a mismatch in a code segment, between the failed process image 148 and the reference process image 112, processing manager 140 revises the failed process image 148 to bring the code segment in line with the corresponding code segment of the reference process image 112. In an alternative or additional embodiment, processing manager 140 may be configured to generate an updated process image 148 after correcting the root cause associated with the failed process image 148.

At operation 222, processing manager 140 re-deploys the first process image 148 for processing at the first optical computing node 104*a* or a second optical computing node (e.g., 104*b*).

As described above, once the detected root cause associated with the failed process image 148 is resolved (e.g., the updated process image 148 has been generated), processing manager 140 may be configured to re-deploy the failed process image 148. In one embodiment, re-deploying the failed process image 148 includes deploying the updated process image 148. Processing manager 140 may deploy the updated process image 148 at a computing node 104 that originally processed the failed process image 148 or at another computing node 104. Processing manager 140 may be configured to determine whether the updated process image 148 is to be re-deployed at the computing node 104 that originally processed the failed process image 148 based on whether a detected root cause includes a software error or a hardware error detected at the original computing node 104. For example, in response to detecting that a root cause associated with the failed process image 148 corresponds to a software error (e.g., based on comparing the failed process image 148 and the reference process image 112) and not a hardware error (hardware malfunction) associated with the original computing node 104, processing manager 140 may be configured to re-deploy the updated process image 148 at the original computing node 104. In one embodiment, processing manager 140 may be configured to deploy the updated process image 148 at a different computing node 104 (e.g., different from the original computing node 104) even when no hardware error was detected in the original computing node 104, based on a method described below.

In some embodiments, processing manager may be configured to detect hardware errors associated with a computing node 104 that caused a process image 148 to fail at the computing node 104. A hardware error may include insufficient allocation of resources (e.g., processing and/or memory resources) for processing the failed process image 148 or a hardware malfunction associated with the computing node 104 such as processor failure, memory failure, loss of power and the like. Processing manager 140 may be configured to detect insufficient allocation of resources at an original computing node 104 by comparing the failed process image 148 and a corresponding reference process image 112 and detecting a mismatch in resource allocation between the failed process image 148 and a corresponding reference process image 112. To detect hardware malfunctions associated with computing nodes 104, processing manager 140 may be configured to monitor a plurality of performance related parameters associated with each computing node 104. Processing manager 140 may determine that a particular computing node 104 has a particular hardware malfunction when an associated performance parameter does not satisfy pre-set performance standards. In response to detecting that the failed process image 148 failed because of a hardware error including insufficient resource allocation (e.g., memory allocation) at the original computing node 104, processing manager 140 may be configured to deploy an updated process image (e.g., with corrected resource allocation) at the original computing node 104.

On the other hand, in response to detecting that the failed process image 148 failed because of a hardware malfunction associated with the original computing node 104, processing manager 140 may be configured to deploy the same failed process image 148 at a different computing node 104. Processing manager 140 may be configured to determine an appropriate computing node 104, that is different from the original computing node 104, to re-deploy the failed process image 148, for example, in response to detecting the failed process image 148 failed because of a hardware malfunction associated with the original computing node 104. To determine an appropriate computing node 104 to re-deploy the failed process image 148, processing manager 140 may be configured to search for and determine a computing node 104 that has sufficient resources (e.g., processing and/or memory resources) available to process the failed process image 148. In this context, processing manager 140 analyzes one or more attributes associated with the failed process image 148, wherein the one or more attributes are indicative of an amount of resources needed to process the first process image. Processing manager 140 determines the amount of resources needed to process the failed process image 148 based on analyzing the attributes associated with the failed process image 148. Processing manager 140 searches for a computing node 104 that has available at least the determined amount of resources needed to process the failed process image 148. Processing manager 140 accesses node information 144 which includes recent information regarding resources currently available at computing nodes 104. In one embodiment, node information 144 is continually updated (e.g., periodically and/or according to a pre-set schedule) to reflect the recent information regarding resources available at the computing nodes 104. Based on reviewing the node information 144, processing manager 140 identifies a computing node 104 that at least has the determined amount of resources available to process the failed process image 148 and deploys the failed process image 148 at the identified computing node 104.

In one or more embodiments, processing manager 140 may be configured to authenticate the failed process image or the updated process image (whichever the case may be) using a Zero Knowledge Proof (ZKP) logic 150 before re-deploying at a computing node 104. ZKP is often used in decentralized distributed networks (e.g., distributed computing network 130) to verify information without compromising sensitive data. Data included and/or associated with process images 148 may be vulnerable to cyber attacks when they fail to process correctly and during re-deployment. Verifying a failed process image 148 or updated process image 148 using the ZKP logic 150 before re-deploying at a computing node 104 enhances data privacy and data security in distributed networks 130.

In some embodiments, processing manager 140 may be configured to use a machine learning model 142 to perform one or more of determining errors/root causes associated with failed process images 148 and resolving errors associated with failed process images 148. For example, the machine learning model 142 may be trained using reference process images 112 from the image repository 110 to determine errors/root causes associated with failed process images 148.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:

a memory configured to store a plurality of reference process images:

a processor communicably coupled to the memory and configured to:

receive a command to process a job;

generate a plurality of process images associated with processing the job, wherein each process image represents a portion of the processing of the job;

deploy the plurality of process images for processing on a plurality of optical computing nodes, wherein each of the plurality of optical computing nodes is assigned a portion of the process images;

detect that a first process image failed to process at a first optical computing node of the plurality of optical computing nodes;

access from the memory, a first reference process image corresponding to the failed first process image;

compare the failed first process image to the first reference process image, wherein the comparison includes comparing metadata associated with the failed first process image and the first reference process image;

determine, based on the comparison, a root cause that caused the first process image to fail at the first optical computing node, wherein the root cause includes an inconsistency in the metadata between the failed first process image and the first reference process image;

resolve the root cause associated with the first process image by removing the inconsistency between the first process image and the first reference process image; and re-deploy the first process image for processing at the first optical computing node or a second optical computing node.

2. The system of claim 1, wherein the processor is further configured to:

detect that the root cause that caused the first process image to fail is associated with a malfunction associated with the first optical computing node; and in response to detecting that the root cause that caused the first process image to fail is associated with a malfunction associated with the first optical computing node, re-deploy the first process image for processing at the second optical computing node.

3. The system of claim 2, wherein the processor is further configured to:

analyze one or more attributes associated with the first process image, wherein the one or more attributes are indicative of an amount of resources needed to process the first process image;

search the plurality of optical computing nodes for an optical computing node that has the needed amount of resources available to process the first process image;

detect, based on the search, that the second optical computing node has the needed amount of resources available to process the first process image; and in response to detecting that the second optical computing node has the needed amount of resources available to process the first process image, re-deploy the first process image for processing at the second optical computing node.

4. The system of claim 3, wherein the resources needed to process the first process image includes optical or photonic memory needed to process the first process image.

5. The system of claim 1, wherein the processor is configured to re-deploy the first process image by:

generating an updated first process image after resolving the root cause associated with the first process image; and deploying the updated first process image for processing at the first optical computing node.

6. The system of claim 1, wherein the processor is configured to re-deploy the first process image by:

generating an updated first process image after resolving the root cause associated with the first process image; and deploying the updated first process image for processing at the second optical computing node.

7. The system of claim 1, wherein the processor is further configured to:

authenticate the first process image using a Zero Knowledge Proof (ZKP) method before re-deploying for processing at the first optical computing node or the second optical computing node.

8. A method for resolving errors in a job, comprising:

receiving a command to process the job;

generating a plurality of process images associated with processing the job, wherein each process image represents a portion of the processing of the job;

deploying the plurality of process images for processing on a plurality of optical computing nodes, wherein each of the plurality of optical computing nodes is assigned a portion of the process images;

detecting that a first process image failed to process at a first optical computing node of the plurality of optical computing nodes;

obtaining a first reference process image corresponding to the failed first process image;

comparing the failed first process image to the first reference process image, wherein the comparison includes comparing metadata associated with the failed first process image and the first reference process image;

determining, based on the comparison, a root cause that caused the first process image to fail at the first optical computing node, wherein the root cause includes an inconsistency in the metadata between the failed first process image and the first reference process image;

resolving the root cause associated with the first process image by removing the inconsistency between the first process image and the first reference process image; and re-deploying the first process image for processing at the first optical computing node or a second optical computing node.

9. The method of claim 8, further comprising:

detecting that the root cause that caused the first process image to fail is associated with a malfunction associated with the first optical computing node; and in response to detecting that the root cause that caused the first process image to fail is associated with a malfunction associated with the first optical computing node, re-deploying the first process image for processing at the second optical computing node.

10. The method of claim 9, further comprising:

analyzing one or more attributes associated with the first process image, wherein the one or more attributes are indicative of an amount of resources needed to process the first process image;

searching the plurality of optical computing nodes for an optical computing node that has the needed amount of resources available to process the first process image;

detecting, based on the search, that the second optical computing node has the needed amount of resources available to process the first process image; and in response to detecting that the second optical computing node has the needed amount of resources available to process the first process image, re-deploying the first process image for processing at the second optical computing node.

11. The method of claim 10, wherein the resources needed to process the first process image includes optical or photonic memory needed to process the first process image.

12. The method of claim 8, wherein re-deploying the first process image comprises:

generating an updated first process image after resolving the root cause associated with the first process image; and deploying the updated first process image for processing at the first optical computing node.

13. The method of claim 8, wherein re-deploying the first process image comprises:

generating an updated first process image after resolving the root cause associated with the first process image; and deploying the updated first process image for processing at the second optical computing node.

14. The method of claim 8, further comprising:

authenticating the first process image using a Zero Knowledge Proof (ZKP) logic before re-deploying for processing at the first optical computing node or the second optical computing node.

15. A non-transitory computer-readable medium storing instructions that when executed by a processor cause the processor to:

receive a command to process a job;

generate a plurality of process images associated with processing the job, wherein each process image represents a portion of the processing of the job;

deploy the plurality of process images for processing on a plurality of optical computing nodes, wherein each of the plurality of optical computing nodes is assigned a portion of the process images;

detect that a first process image failed to process at a first optical computing node of the plurality of optical computing nodes;

obtain a first reference process image corresponding to the failed first process image;

compare the failed first process image to the first reference process image, wherein the comparison includes comparing metadata associated with the failed first process image and the first reference process image;

determine, based on the comparison, a root cause that caused the first process image to fail at the first optical computing node, wherein the root cause includes an inconsistency in the metadata between the failed first process image and the first reference process image;

resolve the root cause associated with the first process image by removing the inconsistency between the first process image and the first reference process image; and re-deploy the first process image for processing at the first optical computing node or a second optical computing node.

16. The non-transitory computer-readable medium of claim 15, wherein the instructions further cause the processor to:

detect that the root cause that caused the first process image to fail is associated with a malfunction associated with the first optical computing node; and in response to detecting that the root cause that caused the first process image to fail is associated with a malfunction associated with the first optical computing node, re-deploy the first process image for processing at the second optical computing node.

17. The non-transitory computer-readable medium of claim 16, wherein the instructions further cause the processor to:

analyze one or more attributes associated with the first process image, wherein the one or more attributes are indicative of an amount of resources needed to process the first process image;

search the plurality of optical computing nodes for an optical computing node that has the needed amount of resources available to process the first process image;

detect, based on the search, that the second optical computing node has the needed amount of resources available to process the first process image; and in response to detecting that the second optical computing node has the needed amount of resources available to process the first process image, re-deploy the first process image for processing at the second optical computing node.

18. The non-transitory computer-readable medium of claim 17, wherein the resources needed to process the first process image includes optical or photonic memory needed to process the first process image.

19. The non-transitory computer-readable medium of claim 15, wherein re-deploying the first process image comprises:

generating an updated first process image after resolving the root cause associated with the first process image; and deploying the updated first process image for processing at the first optical computing node.

20. The non-transitory computer-readable medium of claim 15, wherein re-deploying the first process image comprises:

generating an updated first process image after resolving the root cause associated with the first process image; and deploying the updated first process image for processing at the second optical computing node.

* * * * *